(12) United States Patent
Chang et al.

(10) Patent No.: US 10,379,683 B2
(45) Date of Patent: Aug. 13, 2019

(54) PRESSURE AND TOUCH SENSITIVE PANEL, SYSTEM AND TOUCH SENSITIVE PROCESSING APPARATUS AND METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW); Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 126 days.

(21) Appl. No.: 15/185,008

(22) Filed: Jun. 16, 2016

(65) Prior Publication Data

US 2016/0370899 A1 Dec. 22, 2016

Related U.S. Application Data

(60) Provisional application No. 62/180,301, filed on Jun. 16, 2015.

(30) Foreign Application Priority Data

Dec. 31, 2015 (TW) .............................. 104144655 A

(51) Int. Cl.
*G06F 3/041* (2006.01)
*G06F 3/044* (2006.01)

(52) U.S. Cl.
CPC ............ *G06F 3/044* (2013.01); *G06F 3/0414* (2013.01); *G06F 2203/04105* (2013.01); *G06F 2203/04106* (2013.01)

(58) Field of Classification Search
CPC ............... G06F 3/044; G06F 3/0414; G06F 2203/04105; G06F 2203/04106
See application file for complete search history.

(56) References Cited

U.S. PATENT DOCUMENTS

| 7,926,365 | B2 | 4/2011 | Yeh et al. | |
|---|---|---|---|---|
| 2006/0279548 | A1* | 12/2006 | Geaghan | G06F 3/0416 345/173 |
| 2008/0296073 | A1* | 12/2008 | McDermid | G06F 3/045 178/18.05 |
| 2011/0025631 | A1* | 2/2011 | Han | G06F 3/0414 345/173 |
| 2011/0157087 | A1* | 6/2011 | Kanehira | G06F 3/0414 345/174 |
| 2013/0100072 | A1* | 4/2013 | Liao | G06F 3/044 345/174 |
| 2015/0062072 | A1 | 3/2015 | Shih et al. | |

(Continued)

FOREIGN PATENT DOCUMENTS

| CN | 104423737 | 3/2015 |
|---|---|---|
| CN | 104423748 | 3/2015 |
| TW | 201007149 | 2/2010 |

*Primary Examiner* — Ariel A Balaoing
(74) *Attorney, Agent, or Firm* — WPAT, PC

(57) ABSTRACT

The present invention provides a pressure and touch sensitive panel, comprising: at least one elastic and dielectric element; and an enclosed force sensitive electrode located by one side of the elastic and dielectric element. The enclosed force sensitive electrode comprises multiple electrical wiring points for connecting to a touch sensitive processing apparatus for the pressure and touch sensitive panel.

10 Claims, 5 Drawing Sheets

(56) References Cited

U.S. PATENT DOCUMENTS

2015/0062452 A1    3/2015  Shih et al.
2015/0301642 A1*  10/2015  Hanauer ............... G06F 3/0414
                                                                  345/174

* cited by examiner

PRESSURE AND TOUCH SENSITIVE PANEL, SYSTEM AND TOUCH SENSITIVE PROCESSING APPARATUS AND METHOD THEREOF

CROSS REFERENCE TO RELATED APPLICATIONS

This application claims priority to U.S. patent application, 62/180,301, filed on Jun. 16, 2015, the disclosure of which is incorporated herein by reference.

BACKGROUND OF THE INVENTION

1. Field of the Invention

The present invention relates to the field of pressure detection, and more particularly, to a pressure and touch sensitive technique.

2. Description of the Prior Art

Touch sensitive panels and touch sensitive screens have already been very important input interfaces in modern electronic products, but traditional touch sensitive panels and touch sensitive screens can only detect the position of an object touching the touch sensitive area. For capacitive touch sensitive panels/screens, it is very difficult to infer the pressure value that the object exerts on the touch sensitive area by the signal of detecting the position of the object.

Existing touch sensitive panels detect an external object by the change of physical quantities, such as the change of capacitance, which occurs when the external object approaches or touches the touch sensitive panels. But, most of them can only detect the approaching or touching position. If the pressure on the surface of the touch sensitive panel can further be detected, the different signals thus can be derived based on the change of detected pressure value for providing to the electronic device as new function developments. Current capacitive touch sensitive panel can detect the capacitive increase produced by the area increase of the external object, but the accuracy is poor and it is easy to be misjudged.

Thus, a pressure sensing panel and an electronic device applied the pressure sensing panel are required. They can detect pressure correctly and can also calculate a center position and a strength of a pressure exerted by an external object.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In an embodiment, this invention provides a pressure and touch sensitive panel, including: at least one elastic and dielectric element; and a ring force sensitive electrode located by one side of the elastic and dielectric element, wherein the ring force sensitive electrode includes multiple electrical wiring points for connecting to a touch sensitive processing apparatus for the pressure and touch sensitive panel.

In an embodiment, this invention provides a pressure and touch sensitive panel, including: a touch sensitive substrate; at least one elastic and dielectric element; and a ring force sensitive electrode located by one side of the elastic and dielectric element, wherein the ring force sensitive electrode includes multiple electrical wiring points for connecting to a touch sensitive processing apparatus for the pressure and touch sensitive panel. The touch sensitive substrate and the ring force sensitive electrode are respectively disposed at two sides of the elastic and dielectric element.

In an embodiment, this invention provides a touch sensitive processing apparatus configured to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps comprising: directing the driving circuit to emit a driving signal by at least one of the multiple first electrodes; directing the measuring circuit to measure pressure sensitive measured values of the driving signal induced by the ring force sensitive electrode from at least two of the multiple electrical wiring points; and comparing the pressure sensitive measured values to a base pressure sensitive measured value in order to calculate a position and a strength of an exerted pressure on the pressure and touch sensitive panel.

In an embodiment, this invention provides a pressure and touch sensitive processing method used to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The pressure and touch sensitive processing method includes: emitting a driving signal by at least one of the multiple first electrodes; measuring pressure sensitive measured values of the driving signal induced by the ring force sensitive electrode from at least two of the multiple electrical wiring points; and comparing the pressure sensitive measured values to a base pressure sensitive measured value in order to calculate a position and a strength of an exerted pressure on the pressure and touch sensitive panel.

In an embodiment, this invention provides a pressure and touch sensitive system includes a pressure and touch sensitive panel, and a touch sensitive processing apparatus. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps including: directing the driving circuit to emit a driving signal by at least one of the multiple first electrodes; directing the measuring circuit to measure pressure sensitive measured values of the driving signal induced by the ring force sensitive electrode from at least two of the multiple electrical wiring points; and comparing the pressure sensitive measured values to a base pressure sensitive measured value in order to calculate a position and a strength of an exerted pressure on the pressure and touch sensitive panel.

In an embodiment, this invention provides a touch sensitive processing apparatus configured to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps including: directing the driving circuit to emit a driving signal by at least part of the multiple electrical wiring points; directing the measuring circuit to simultaneously measure the multiple first electrodes and the multiple second electrodes to obtains two sets of one dimensional sensing information; and comparing the two sets of one dimensional sensing information to a base one dimensional sensing information respectively in order to calculate a position and a strength of an exerted pressure on the pressure and touch sensitive panel.

In an embodiment, this invention provides a pressure and touch sensitive processing method used to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The pressure and touch sensitive processing method includes: emitting a driving signal by at least part of the multiple electrical wiring points; measuring the multiple first electrodes and the multiple second electrodes at the same time to obtains two sets of one dimensional sensing information; and comparing the two sets of one dimensional sensing information to a base one dimensional sensing information respectively in order to calculate a position and a strength of an exerted pressure on the pressure and touch sensitive panel.

In an embodiment, this invention provides a pressure and touch sensitive system includes a pressure and touch sensitive panel, and a touch sensitive processing apparatus. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The pressure and touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps including: directing the driving circuit to emit a driving signal by at least part of the multiple electrical wiring points; directing the measuring circuit to simultaneously measure the multiple first electrodes and the multiple second electrodes to obtains two sets of one dimensional sensing information; and comparing the two sets of one dimensional sensing information to a base one dimensional sensing information respectively in order to calculate a position and a strength of an exerted pressure on the pressure and touch sensitive panel.

In an embodiment, this invention provides a pressure and touch sensitive panel, including: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element.

In an embodiment, this invention provides a touch sensitive processing apparatus configured to control a pressure and touch sensitive panel. The pressure and touch sensitive panel includes: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element. The touch sensitive processing apparatus connects to the multiple first electrodes, the multiple second electrodes, the two first force sensitive electrodes, and the two second force sensitive electrodes. The touch sensitive processing apparatus includes at least one driving circuit, at least one measuring circuit, and a processor configured to perform the following steps including: directing the driving circuit to drive the two first force sensitive electrodes in turn or at the same time; directing the measuring circuit to measure two first measuring values from two outermost of the first electrodes; directing the driving circuit to drive the two second force sensitive electrodes in turn or at the same time; directing the measuring circuit to measure two second measuring values from two outermost of the second electrodes; and comparing the two first measuring values and the two second measuring values to a base measuring value respectively in order to calculate a position and a strength of an exerted pressure on the pressure and touch sensitive panel.

In an embodiment, this invention provides a pressure and touch sensitive processing method used to control a pressure and touch sensitive panel. The pressure and touch sensitive panel includes: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element. The pressure and touch sensitive processing method includes: driving the two first force sensitive electrodes in turn or at the same time; measuring two first measuring values from two outermost of the first electrodes; driving the two second force sensitive electrodes in turn or at the same time; measuring two second measuring values from two outermost of the second electrodes; and comparing the two first measuring values and the two second measuring values to a base measuring value respectively in order to calculate a position and a strength of an exerted pressure on the pressure and touch sensitive panel.

In an embodiment, this invention provides a pressure and touch sensitive system includes a pressure and touch sensitive panel, and a touch sensitive processing apparatus. The pressure and touch sensitive panel includes: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element. The touch sensitive processing apparatus connects to the multiple first electrodes, the multiple second electrodes, the two first force sensitive electrodes, and the two second force sensitive electrodes. The touch sensitive processing apparatus includes at least one driving circuit, at least one measuring circuit, and a processor configured to perform the following steps including: directing the driving circuit to drive the two first force sensitive electrodes in turn or at the same time; directing the measuring circuit to measure two first measuring values from two outermost of the first electrodes; directing the driving circuit to drive the two second force sensitive electrodes in turn or at the same time; directing the measuring circuit to measure two second measuring values from two outermost of the second electrodes; and comparing the two first measuring values and the two second measuring values to a base measuring value respectively in order to calculate a position and a strength of an exerted pressure on the pressure and touch sensitive panel.

One of the objects of the present invention is to provide a pressure and touch sensitive panel, system and touch sensitive processing apparatus and method thereof for detecting a pressure position and strength on the pressure and touch sensitive panel. Another object of the present invention is that not only detecting a pressure position and strength on the pressure and touch sensitive panel, but also performing a mutual capacitance detection to find a position of an external conductive object approaching or touching the pressure and touch sensitive panel.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
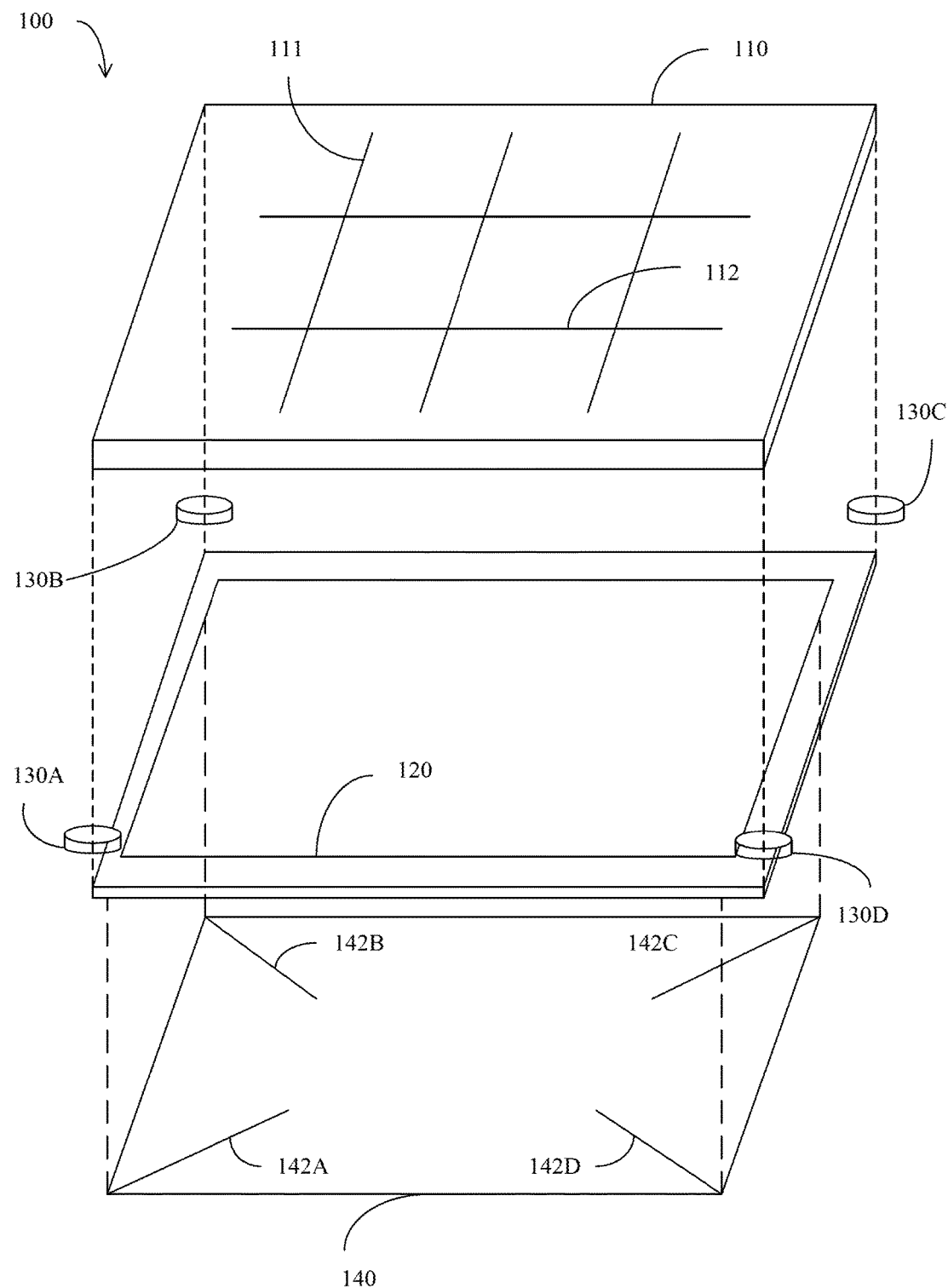
FIG. 1 illustrates a structure of a capacitive pressure and touch sensitive panel according to an embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

For the convenience of illustration and explanation, the term of touch sensitive panel used in this application encompasses touch sensitive screen, and vice versa. When the term of touch sensitive screen is adopted, each element in this application may be transparent for a user to see the touch sensitive screen.

One of the features of the present invention is to detect the pressure value of the touching object exerted on the touch sensitive panel/screen, by using the electrodes on the capacitive touch sensitive panel/screen. Referring to FIG. 1, it illustrates a structure of a capacitive pressure and touch sensitive panel 100 according to an embodiment of the present invention. The capacitive pressure and touch sensitive panel 100 shown in FIG. 1 may include a traditional touch sensitive substrate 110 further including multiple first electrodes 111 being parallel to a first axis and multiple second electrodes 112 being parallel to a second axis. A touch sensitive processing unit (or a touch sensitive processing apparatus) not shown in FIG. 1 is configured to connect these first electrodes 111 and second electrodes 112, in order to detect an approximate (approaching or touching) object above the touch sensitive panel 100.

A person of ordinary skill in the art can appreciate the principle of mutual capacitance detection. The touch sensitive processing unit may sequentially direct/cause at least one of the first electrodes 111 to emit a driving signal in certain a frequency, and then measure the signal sensed by some of the second electrodes 112, to determine whether the touch sensitive panel is affected by the approximate object. If the touch sensitive panel is affected by the approximate object, the touch sensitive processing unit can determine the position of the approximate object based on variations in its signal(s).

An elastic insulating object (or an elastic and dielectric element) 120 may be included below the traditional touch sensitive substrate 110. The insulating object 120 has a shape of ring and is disposed around a circumference of a bottom of the touch sensitive substrate 110, for supporting the touch sensitive substrate 110. And the insulating object 120 may be made of transparent rubber material or other elastic insulating substance. The present invention is not limited to the insulating object 120 including a complete ring, and the insulating object 120 may alternatively include multiple sections of insulating bars, whose respective elastic moduli (coefficient) may be the same or different.

In one embodiment, multiple spacers 130 may be included between the insulating object 120 and the touch sensitive substrate 110. As shown in FIG. 1, the capacitive pressure and touch sensitive panel 100 includes four spacers 130A-130D. The spacer 130 may be elastic or made of hard and inelastic material, and the shape of the spacer 130 is not limited to that shown in FIG. 1. In one embodiment, the insulating object 120 and these spacers 130 are made integral. In another embodiment, these spacers 130 may be omitted.

A pressure sensitive electrode (or a force sensitive electrode) 140 in a shape of ring is further included which is shown below the insulating object 120. The pressure sensitive electrode 140 is configured to be disposed around the circumference of the touch sensitive substrate 110. In one embodiment, the position of the pressure sensitive electrode 140 when perpendicularly projected upwards to the touch sensitive substrate 110 corresponds to that of the outermost first electrodes 111 and the outermost second electrodes 112. In another embodiment, the position of the pressure sensitive electrode 140 is outer from that of the outermost first electrodes 111 and the outermost second electrodes 112.

The pressure sensitive electrode 140 in the present invention may be used as a sensor, and may also be used as a driving electrode. In certain embodiments where it is used as a sensor, as shown in FIG. 1, at least four contacts (or at least four electrical wiring points) 142A-D may be laid from the four corners of the pressure sensitive electrode 140, for connection to the touch sensitive processing unit.

In detecting by mutual capacitance, when the touch sensitive processing unit directs/causes at least one of the first electrodes 111 to emit a driving signal, not only the driving signal will be sensed by the second electrodes 112, but the pressure sensitive electrode 140 will also sense the driving signal. When an approximate object exerts a pressure on the touch sensitive substrate 110, the touch sensitive substrate 110 will in turn press downwards the spacer(s) 130 and the elastic insulating object 120. Therefore, the distance between the first electrode 111 emitting the driving signal and the pressure sensitive electrode 140 will be reduced, resulting in an increase of the induced capacitive charge.

In one example, when the touch sensitive processing unit directs/causes certain a first electrode 111 to emit a driving signal, the touch sensitive processing unit may measure an induced current respectively with the four contacts 142A-D. A variation occurring in the measured current reflects a variation occurring in the vertical distance between the touch sensitive substrate 110 and the pressure sensitive electrode 140. In addition, the touch sensitive processing unit can also obtain the actual position of the approximate object by mutual capacitance detection and/or other ways of detection. Using both of the position information and current variations measured by ambient circuits of the pressure sensitive electrode 140, the touch sensitive processing unit can further calculate the pressure value exerted by the approximate object on the touch sensitive substrate 110.

In an example of this embodiment, during a period of a time of performing mutual capacitance detection by the touch sensitive processing unit, multiple detection values associated with each of the contacts 142 of the pressure sensitive electrode 140 may be obtained, and the touch sensitive processing unit may average these detection values or respectively accumulate these detection values of each contact.

In a variant of this embodiment, the pressure sensitive electrode 140 may include more wire contacts such as 6 or 8 contacts, without being limited to 4 contacts laid from four corners of the pressure sensitive electrode 140 shown in FIG. 1. A person of ordinary skill in the art can understand that using more wire contacts can obtain a pressure value that is more precise.

In another variant of this embodiment, the touch sensitive processing unit may direct/cause the outermost first electrode 111 to emit a driving signal and afterward perform measurement on the contact(s) 142 of the pressure sensitive electrode 140. For example, only upon causing/directing the first one and the last one of the first electrodes 111 to emit a driving signal, the touch sensitive processing unit then performs measurement on the contact(s) 142 of the pressure sensitive electrode 140.

In still another variant of this embodiment, when causing/directing the first one of the first electrodes 111 to emit a driving signal, the touch sensitive processing unit may perform measurement on corresponding contacts 142B and 142C. And when causing/directing the last one of the first electrodes 111 to emit a driving signal, the touch sensitive processing unit may perform measurement on corresponding contacts 142A and 142C. Also, when causing/directing the first one of the first electrodes 111 to emit a driving signal, the touch sensitive processing unit may perform measurement on corresponding contacts 142A and 142B. And when causing/directing the last one of the first electrodes 111 to emit a driving signal, the touch sensitive processing unit may perform measurement on corresponding contacts 142C and 142D.

The above embodiments illustrate the situation of using the pressure sensitive electrode 140 as a sensor. In another embodiment of the present invention, the pressure sensitive electrode 140 may be used to emit the driving signal. In one example, the touch sensitive processing unit may direct/cause the pressure sensitive electrode 140 to emit driving signal with one or more of the contacts 142. Then the driving signal emitted by the pressure sensitive electrode 140 may be sensed by the first electrode(s) 111 and the second electrode(s) 112. When the approximate object touches the touch sensitive substrate 110, the touch sensitive substrate 110 presses downwards on the insulating object 120 and/or the spacer 130, which pressing decreases the distance between the pressure sensitive electrode 140 and the touch sensitive substrate 110. In this case, the touch sensitive processing unit can measure the variation in the driving signal sensed by the first electrode(s) 111 and the second electrode(s) 112. In addition, the touch sensitive processing unit can also obtain the actual position of the approximate object by mutual capacitance detection and/or other ways of detection. Using both of the position information and variations in the driving signal sensed by the first electrode(s) 111 and the second electrode(s) 112, the touch sensitive processing unit can further calculate the pressure value exerted by the approximate object on the touch sensitive substrate 110.

In an example of this embodiment, the touch sensitive processing unit may set or divide the session or duration of performing detection into a session of capacitive position detection and a session of pressure sensitive detection. The two sessions of different detection types are separate or not concurrent, but the present invention is not limited to having one of the two kinds of sessions followed by the other kind of session. For example, the capacitive position detection may be performed for three sessions or times, followed by performing the pressure sensitive detection for one session or time. Alternatively, it may be that only upon receiving a request from an upper-layer operating system or a driver program, the touch sensitive processing unit includes the session of the pressure sensitive detection in the duration of performing detection.

In a variant of this embodiment, driving signals emitted by the touch sensitive processing unit respectively during the two kinds of sessions may be the same. During the session of the capacitive position detection, a driving signal is respectively emitted to at least one of the first electrodes 111, and the second electrodes 112 are responsible for sensing the driving signal. During the session of the pressure sensitive detection, the touch sensitive processing unit emits a driving signal to the pressure sensitive electrode 140, and the first electrodes 111 and the second electrodes 112 are responsible for sensing the driving signal.

In another variant of this embodiment, the two outermost first electrodes 111 and the two outermost second electrodes 112 are directed by the touch sensitive processing unit to be responsible for sensing the driving signal(s).

Although the pressure sensitive electrode 140, in the embodiment as shown in FIG. 1, is positioned below the touch sensitive substrate 110, the spacer 130, and the insulating object 120, the pressure sensitive electrode 140, in another embodiment, may be positioned above the touch sensitive substrate 110, with another insulating layer positioned in between. Since the other insulating layer does not (directly) bear the pressure exerted by the approximate object downwards toward the touch sensitive substrate 110, the other insulating layer may be inelastic or be less elastic than the insulating object 120.

When the approximate object presses downwards on the touch sensitive substrate 110, the distance between the pressure sensitive electrode 140 and the touch sensitive substrate 110 is increased by the pressing. This change in distance can be used to measure the variation in the driving signal sensed by the pressure sensitive electrode 140. Or variation in the driving signal emitted by the pressure sensitive electrode 140 may be measured by the first electrode(s) 111 and the second electrode(s) 112. Based on both of the actual position of the approximate object and the measured variation(s), the touch sensitive processing unit can also calculate the pressure value exerted by the approximate object on the touch sensitive substrate 110.

Figure 2:
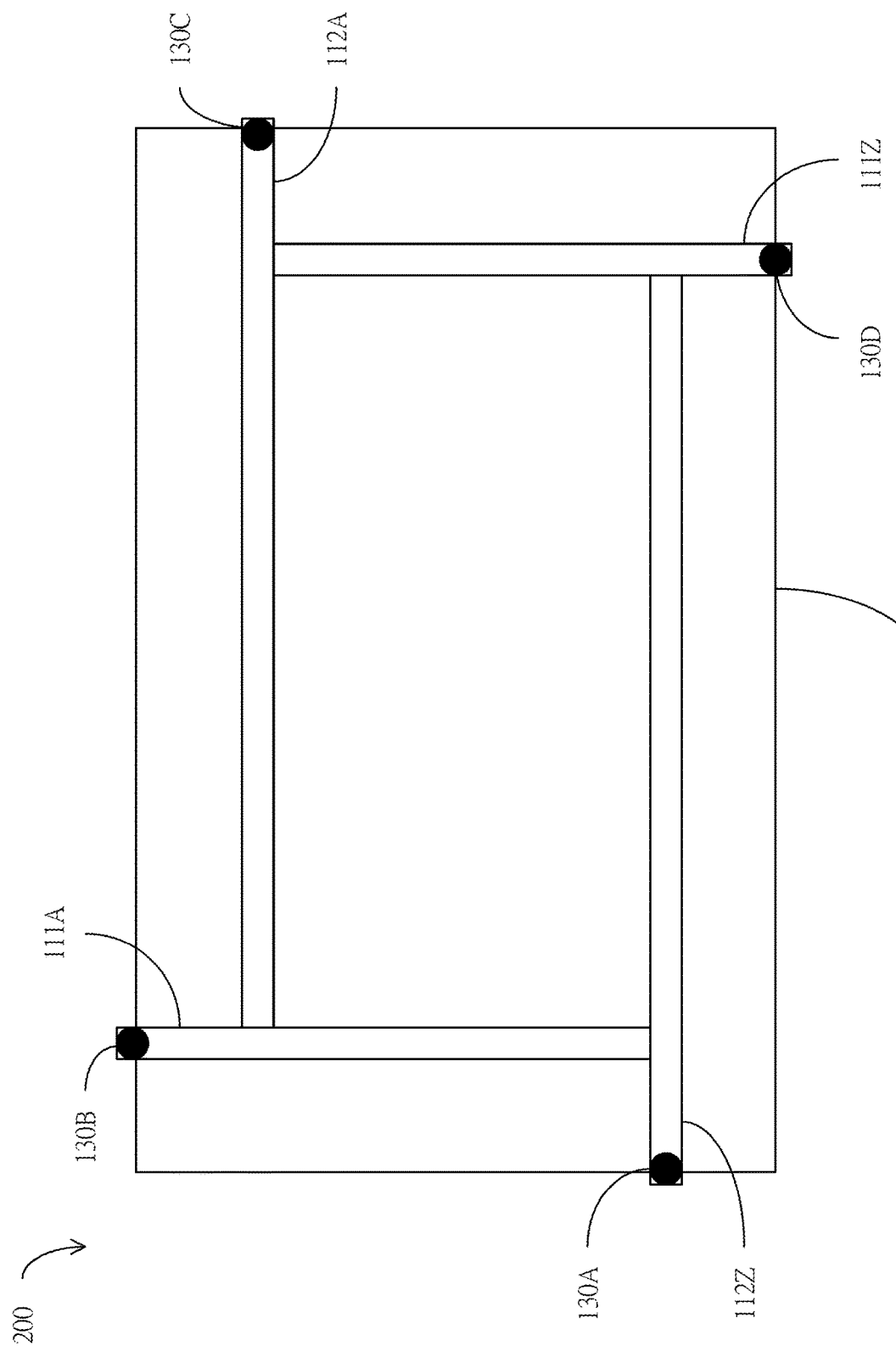
FIG. 2 illustrates a structure of a capacitive pressure and touch sensitive panel according to an embodiment of the present invention.

Referring to FIG. 2, it illustrates a structure of a capacitive touch sensitive panel 200 according to an embodiment of the present invention. The viewing angle of FIG. 2 is viewing downwards from above the touch sensitive substrate in perspective or viewing upwards from below the touch sensitive substrate in perspective. It can be seen from FIG. 2 that the touch sensitive substrate includes two outermost first electrodes 111A and 111Z, respectively located at the leftmost side and the rightmost side. The touch sensitive substrate also includes two outermost second electrodes 112A and 112Z, respectively located at the uppermost side and the lowermost side.

The first electrode 111A may be connected from a side (shown as an upper side in FIG. 2) of the touch sensitive substrate to the touch sensitive processing unit, the first electrode 111Z may be connected from a side (shown as a down side in FIG. 2) of the touch sensitive substrate to the touch sensitive processing unit, the second electrode 112A may be connected from a side (shown as a right side in FIG. 2) of the touch sensitive substrate to the touch sensitive processing unit, and the second electrode 112Z may be connected from a side (shown as a left upside in FIG. 2) of the touch sensitive substrate to the touch sensitive processing unit. In other words, the outermost first electrodes 111 and second electrodes 112 are connected respectively from corresponding sides of the touch sensitive substrate to the touch sensitive processing unit. But the present invention is not limited to the connection configuration of the outermost first electrodes 111 and second electrodes 112 as shown in FIG. 2.

Four spacers 130A-D are included in FIG. 2 and not located within the area enclosed by the four outermost first and second electrodes. In this embodiment, the four spacers 130A-D are respectively located directly below the four outermost first and second electrodes. But the present invention is not limited to the spacers being located respectively directly below the outermost electrodes.

The pressure sensitive electrode 140 shown in FIG. 2 surrounds outside of the area enclosed by the four outermost first and second electrodes. In this embodiment, the pressure sensitive electrode 140 is above or below the four spacers 130A-D. But the present invention is not limited to the pressure sensitive electrode 140 being located above or below the four spacers 130A-D.

Figure 3:
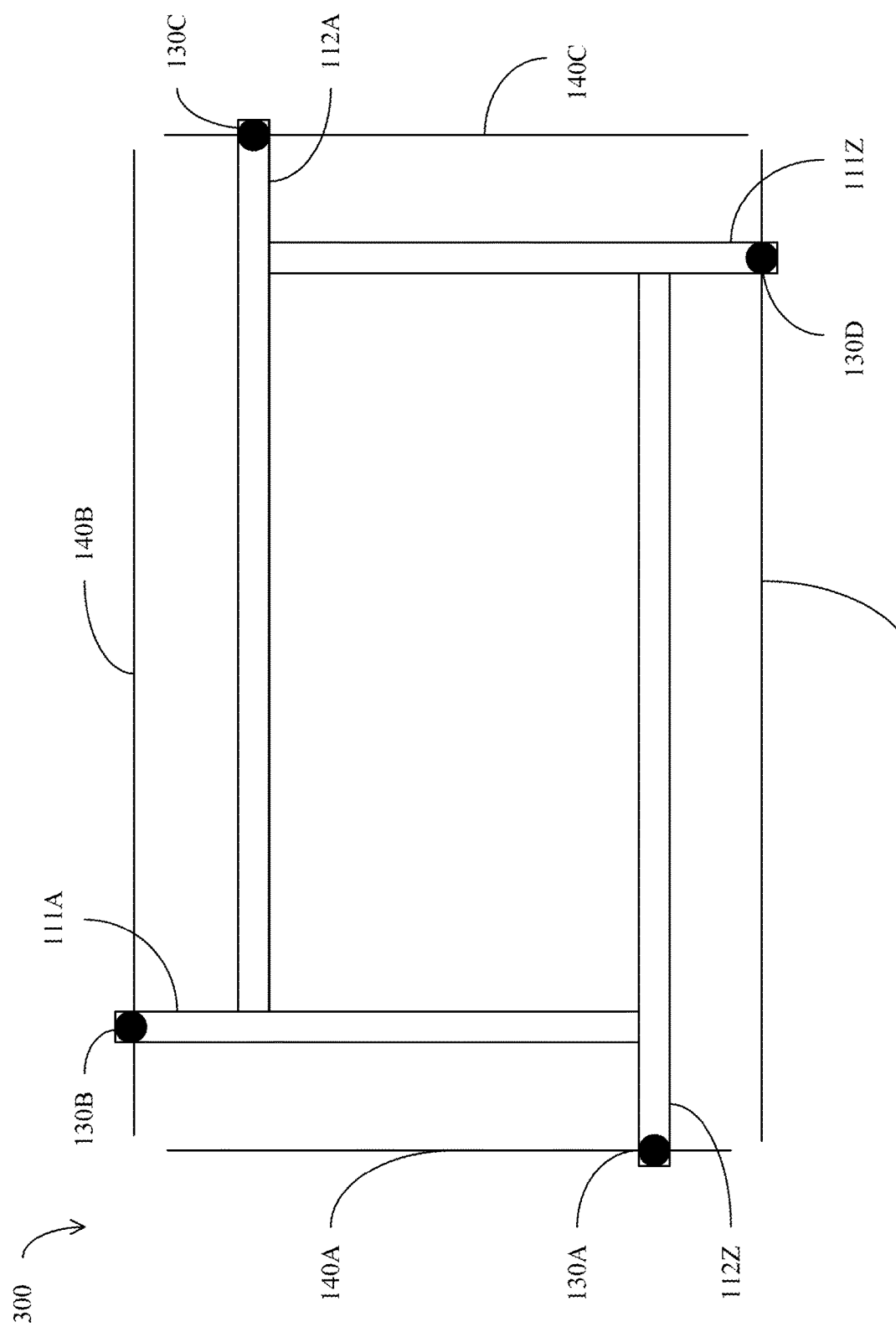
FIG. 3 illustrates a structure of a capacitive pressure and touch sensitive panel according to an embodiment of the present invention.

Referring to FIG. 3, it illustrates a structure of a capacitive pressure and touch sensitive panel 300 according to an embodiment of the present invention. The embodiment shown in FIG. 3 is a variant of the embodiment shown in FIG. 2, and has the pressure sensitive electrode 140 including four sections of pressure sensitive electrodes 140A-D, respectively corresponding to the four outermost electrodes 111A, 111Z, 112A, and 112Z.

When the touch sensitive processing unit directs/causes the pressure sensitive electrode 140A to emit a driving signal, the first electrode 111A may be used to sense the driving signal; and when the touch sensitive processing unit directs/causes the pressure sensitive electrode 140C to emit a driving signal, the first electrode 111Z may be used to sense the driving signal. Since the distance between the two outermost first electrodes 111A and 111Z is relatively long, the pressure sensitive electrodes 140A and 140C may concurrently emit driving signals, and the first electrodes 111A and 111Z may concurrently be used to sense the driving signals.

Similarly, when the touch sensitive processing unit directs/causes the pressure sensitive electrode 140B to emit a driving signal, the second electrode 112A may be used to sense the driving signal; and when the touch control processing unit directs/causes the pressure sensitive electrode 140D to emit a driving signal, the second electrode 112Z may be used to sense the driving signal. Since the distance between the two outermost second electrodes 112A and 112Z is relatively long, the pressure sensitive electrodes 140B and 140D may concurrently emit driving signals, and the second electrodes 112A and 112Z may concurrently be used to sense the driving signals.

In an embodiment of the invention, the shape of the touch sensitive substrate 110 is not limited to a rectangle or a rhombus, and may be other shape such as a circle or an ellipse. In this embodiment, the shapes respectively of the pressure sensitive electrode 140 and the insulating object 120 may be adapted with the shape of the touch sensitive substrate 110. When the shape of the touch sensitive substrate 110 is changed to be a circle or an ellipse, the shapes respectively of the pressure sensitive electrode 140 and the insulating object 120 will correspondingly be a circle or an ellipse.

Figure 4:
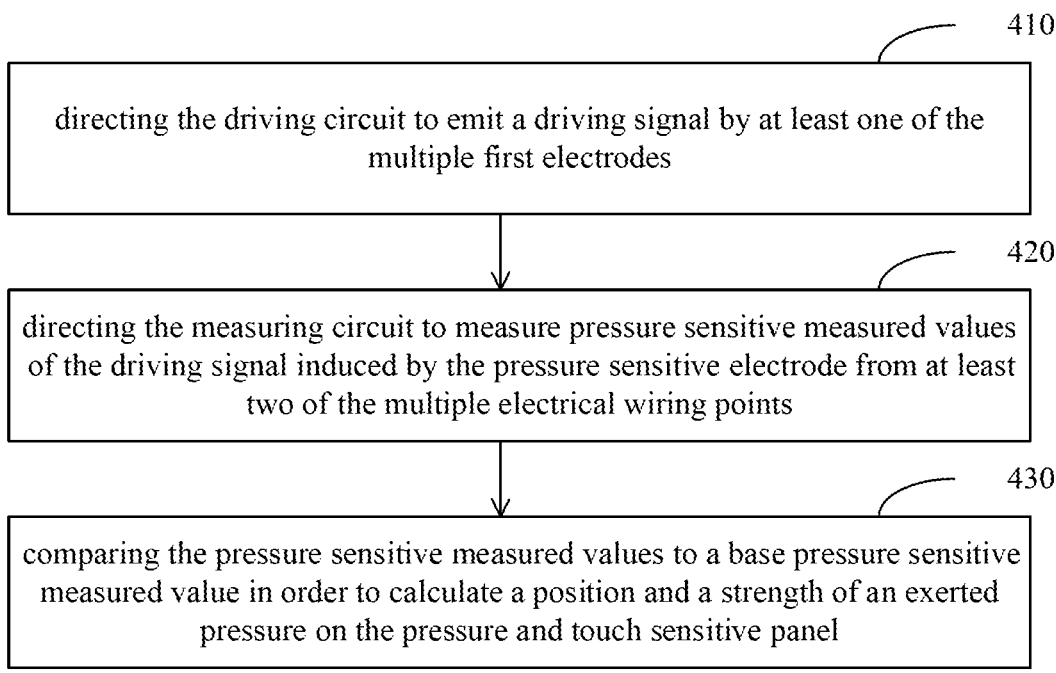
FIG. 4 shows a flowchart of a pressure and touch sensitive processing method according to an embodiment of the present invention.

Referring to FIG. 4, it illustrates a flowchart of a pressure and touch sensitive processing method according to an embodiment of the present invention. The pressure and touch sensitive processing method shown in FIG. 4 may adapt to the structures of the capacitive pressure and touch sensitive panels shown in FIGS. 1 and 2, and be implemented by software or hardware executed by a touch sensitive processing apparatus. The touch sensitive processing apparatus at least includes a driving circuit, a measuring circuit, and a processor. The processor performs the steps of the flowchart shown in FIG. 4. It should be noted that the present invention is not limited to the steps performed in order except that there is a causal relationship between the steps. Moreover, other steps which do not relate to the present invention may be inserted between the steps as well.

In step 410: directing the driving circuit to emit a driving signal by at least one of the multiple first electrodes. The driving signal may be the same as or different from that one emitted in mutual capacitance detection. In a variation, the first electrode emitting the driving signal is the outermost first electrode.

In step 420: directing the measuring circuit to measure pressure sensitive measured values of the driving signal induced by the pressure sensitive electrode from at least two of the multiple electrical wiring points. In a variation, the processor is further configured to average the pressure sensitive measured values detected from each of the multiple electrical wiring points.

In step 430: comparing the pressure sensitive measured values to a base pressure sensitive measured value in order to calculate a position and a strength of an exerted pressure on the pressure and touch sensitive panel.

Figure 5:
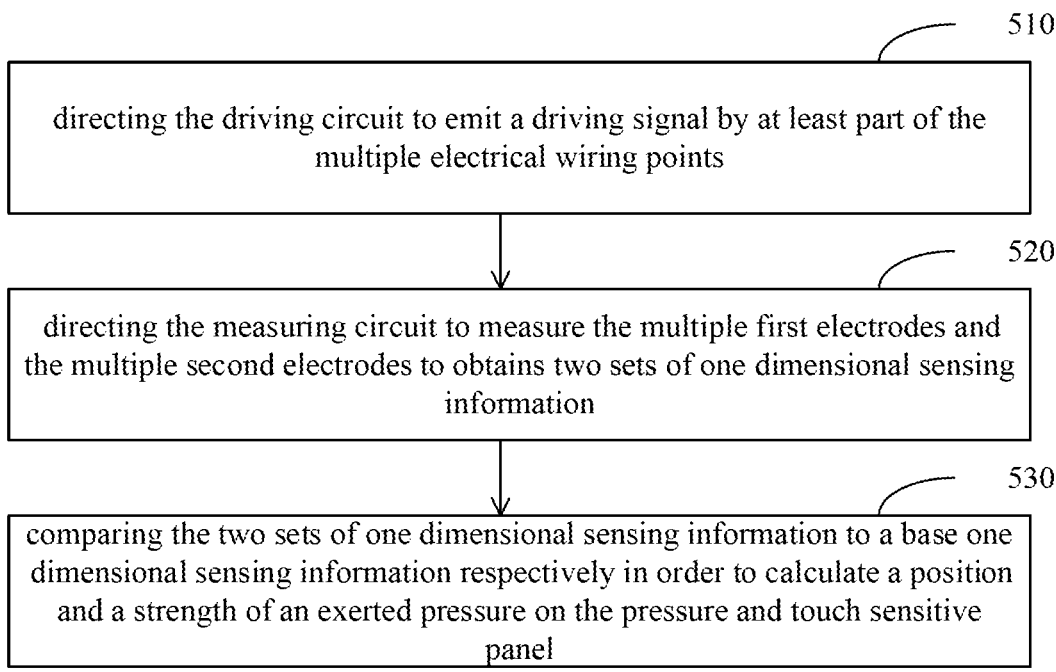
FIG. 5 shows a flowchart of a pressure and touch sensitive processing method according to an embodiment of the present invention.

Referring FIG. 5, it illustrates a flowchart of a pressure and touch sensitive processing method according to an embodiment of the present invention. The pressure and touch sensitive processing method shown in FIG. 5 may adapt to the structures of the capacitive pressure and touch sensitive panels shown in FIGS. 1 and 2, and be implemented by software or hardware executed by a touch sensitive processing apparatus. The touch sensitive processing apparatus at least includes a driving circuit, a measuring circuit, and a processor. The processor performs the steps of the flowchart shown in FIG. 5. It should be noted that the present invention is not limited to the steps performed in order except that there is a causal relationship between the steps. Moreover, other steps which do not relate to the present invention may be inserted between the steps as well.

In step 510: directing the driving circuit to emit a driving signal by at least part of the multiple electrical wiring points.

In step 520: directing the measuring circuit to measure the multiple first electrodes and the multiple second electrodes to obtains two sets of one dimensional sensing information.

In step 530: comparing the two sets of one dimensional sensing information to a base one dimensional sensing information respectively in order to calculate a position and a strength of an exerted pressure on the pressure and touch sensitive panel.

Figure 6:
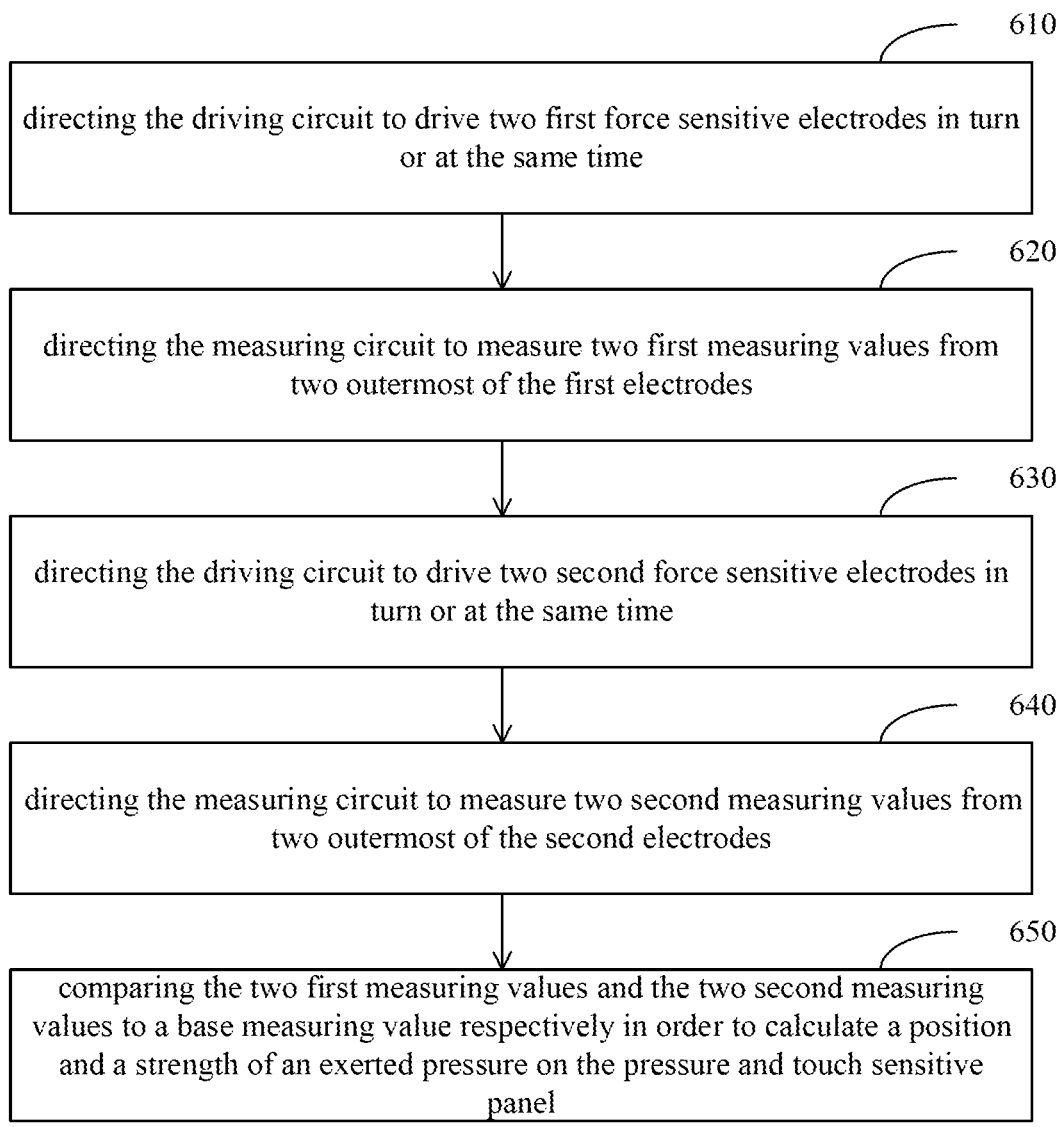
FIG. 6 shows a flowchart of a pressure and touch sensitive processing method according to an embodiment of the present invention.

Referring to FIG. 6, it illustrates a flowchart of a pressure and touch sensitive processing method according to an embodiment of the present invention. The pressure and touch sensitive processing method shown in FIG. 6 may adapt to the structure of the capacitive pressure and touch sensitive panel shown in FIG. 3, and be implemented by software or hardware executed by a touch sensitive processing apparatus. The touch sensitive processing apparatus at least includes a driving circuit, a measuring circuit, and a processor. The processor performs the steps of the flowchart shown in FIG. 6. It should be noted that the present invention is not limited to the steps performed in order except that there is a causal relationship between the steps. Moreover, other steps which do not relate to the present invention may be inserted between the steps as well.

In step 610: directing the driving circuit to drive two first force sensitive electrodes in turn or at the same time. The two first force sensitive electrodes may be the force sensitive electrodes 140A and 140C shown in FIG. 3.

In step 620: directing the measuring circuit to measure two first measuring values from two outermost of the first electrodes. The two outermost of the first electrodes may be the first electrodes 111A and 111Z shown in FIG. 3.

In step 630: directing the driving circuit to drive two second force sensitive electrodes in turn or at the same time. The two second force sensitive electrodes may be the force sensitive electrodes 140B and 140D shown in FIG. 3.

In step 640: directing the measuring circuit to measure two second measuring values from two outermost of the second electrodes. The two outermost of the second electrodes may be the second electrodes 112A and 112Z shown in FIG. 3.

In step 650: comparing the two first measuring values and the two second measuring values to a base measuring value respectively in order to calculate a position and a strength of an exerted pressure on the pressure and touch sensitive panel.

In summary of the above description, one of the characteristics of the present invention is to provide a type of capacitive pressure and touch sensitive panel and the method of detecting pressure thereof. At least one pressure sensitive electrode is provided above or below a circumference or sides of the touch sensitive area to surround the touch sensitive area. In one embodiment, variation(s) in the driving signal of the touch sensitive substrate sensed by the pressure sensitive electrode may be measured, and then the pressure exerted by the approximate object on the touch sensitive substrate can be calculated according to the variation(s) in the driving signal and further based on the position of the approximate object obtained by the touch sensitive substrate. In another embodiment, variation(s) in the driving signal emitted by the pressure sensitive electrode may be measured by the touch sensitive substrate's own electrodes, especially its outermost electrodes, and then the pressure exerted by the approximate object on the touch sensitive substrate can be calculated according to the variation(s) in the driving signal and further based on the position of the approximate object obtained by the touch sensitive substrate.

In an embodiment, the present invention provides a pressure and touch sensitive panel including: at least one elastic and dielectric element; and a ring force sensitive electrode located by one side of the elastic and dielectric element, wherein the ring force sensitive electrode includes multiple electrical wiring points for connecting to a touch sensitive processing apparatus for the pressure and touch sensitive panel.

In certain embodiments, the pressure and touch sensitive panel is adjacent to a touch sensitive substrate, the touch sensitive substrate and the ring force sensitive electrode are respectively disposed at two sides of the elastic and dielectric element. In certain embodiments, the pressure and touch sensitive panel further includes multiple spacers disposed between the elastic and dielectric element and the touch sensitive substrate. In certain embodiments, an elastic coefficient for each of the multiple spacers is different from that of the elastic and dielectric element. In certain embodiments, a shape of the elastic and dielectric element is the same as that of edge of the touch sensitive substrate.

In certain embodiments, the touch sensitive substrate includes multiple first electrodes being parallel to a first axis and multiple second electrodes being parallel to a second axis, the multiple first electrodes and the multiple second electrodes are connected to the touch sensitive processing apparatus. A shape of the ring force sensitive electrode corresponds to two outermost of the multiple first electrodes and two outermost of the multiple second electrodes of the touch sensitive substrate.

In certain embodiments, the shape of the ring force sensitive electrode is bigger than a projection of a rectangle formed by two outermost of the multiple first electrodes and two outermost of the multiple second electrodes of the touch sensitive substrate. The two outermost of the multiple first electrodes and the two outermost of the multiple second electrodes respectively extend to four corresponding edges of the touch sensitive substrate. In certain embodiments, the pressure and touch sensitive panel further includes multiple spacers disposed between the ring force sensitive electrode and the multiple first electrodes and two outermost of the multiple second electrodes of the touch sensitive substrate.

In certain embodiments, a shape of the elastic and dielectric element is the same as that of the ring force sensitive electrode. The elastic and dielectric element includes multiple sections of elastic and dielectric substances. The multiple electrical wiring points are respectively at corners of the ring force sensitive electrode.

In an embodiment, this invention provides a pressure and touch sensitive panel, including: a touch sensitive substrate; at least one elastic and dielectric element; and a ring force sensitive electrode located by one side of the elastic and dielectric element, wherein the ring force sensitive electrode includes multiple electrical wiring points for connecting to a touch sensitive processing apparatus for the pressure and touch sensitive panel, the touch sensitive substrate and the ring force sensitive electrode are respectively disposed at two sides of the elastic and dielectric element.

In certain embodiments, the touch sensitive substrate includes multiple first electrodes being parallel to a first axis and multiple second electrodes being parallel to a second axis, the multiple first electrodes and the multiple second electrodes are connected to the touch sensitive processing apparatus. A shape of the ring force sensitive electrode corresponds to two outermost of the multiple first electrodes and two outermost of the multiple second electrodes of the touch sensitive substrate.

In certain embodiments, the shape of the ring force sensitive electrode is bigger than a projection of a rectangle formed by two outermost of the multiple first electrodes and two outermost of the multiple second electrodes of the touch sensitive substrate. The two outermost of the multiple first electrodes and the two outermost of the multiple second electrodes respectively extend to four corresponding edges of the touch sensitive substrate.

In certain embodiments, a shape of the elastic and dielectric element is the same as that of the ring force sensitive electrode. The elastic and dielectric element includes multiple sections of elastic and dielectric substances. The multiple electrical wiring points are respectively at corners of the ring force sensitive electrode.

In an embodiment, this invention provides a touch sensitive processing apparatus configured to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps including: directing the driving circuit to emit a driving signal by at least one of the multiple first electrode; directing the measuring circuit to measure pressure sensitive measured values of the driving signal induced by the ring force sensitive electrode from at least two of the multiple electrical wiring points; and comparing the pressure sensitive measured values to a base pressure sensitive measured value in order to calculate a position and a strength of an exerted pressure on the pressure and touch sensitive panel.

In certain embodiments, the processor is further configured to direct the driving circuit to emit the driving signal by the multiple first electrodes in turn, when each one of the multiple first electrodes emits the driving signal, the processor directs the measuring circuit to measure sensing values of the multiple second electrodes at the same time in order to obtain one two dimensional sensing information, and the processor obtains a position of an external conductive object approximating the pressure and touch sensitive panel according to the two dimensional sensing information and a base two dimensional sensing information. In certain embodiments, the processor is further configured to average the pressure sensitive measured values detected from each of the multiple electrical wiring points.

In certain embodiments, the first electrode emitting the driving signal is the outermost first electrode.

In an embodiment, this invention provides a pressure and touch sensitive processing method used to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The pressure and touch sensitive processing method includes: emitting a driving signal by at least one of the multiple first electrode; measuring pressure sensitive measured values of the driving signal induced by the ring force sensitive electrode from at least two of the multiple electrical wiring points; and comparing the pressure sensitive measured values to a base pressure sensitive measured value in order to calculate a position and a strength of an exerted pressure on the pressure and touch sensitive panel.

In certain embodiments, the pressure and touch sensitive processing method further including: emitting the driving signal by the multiple first electrodes in turn; measuring sensing values of the multiple second electrodes at the same time when each one of the multiple first electrodes emits the driving signal, in order to obtain one two dimensional sensing information; and obtaining a position of an external conductive object approximating the pressure and touch sensitive panel according to the two dimensional sensing information and a base two dimensional sensing information. In certain embodiments, the pressure and touch sensitive processing method further includes averaging the pressure sensitive measured values detected from each of the multiple electrical wiring points.

In certain embodiments, the first electrode emitting the driving signal is the outermost first electrode.

In an embodiment, the present invention provides a pressure and touch sensitive system includes a pressure and touch sensitive panel and a touch sensitive processing apparatus. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps including: directing the driving circuit to emit a driving signal by at least one of the multiple first electrode; directing the measuring circuit to measure pressure sensitive measured values of the driving signal induced by the ring force sensitive electrode from at least two of the multiple electrical wiring points; and comparing the pressure sensitive measured values to a base pressure sensitive measured value in order to calculate a position and a strength of an exerted pressure on the pressure and touch sensitive panel.

In an embodiment, the present invention provides a touch sensitive processing apparatus configured to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps including: directing the driving circuit to emit a driving signal by at least part of the multiple electrical wiring points; directing the measuring circuit to measure the multiple first electrodes and the multiple second electrodes at the same time to obtains two sets of one dimensional sensing information; and comparing the two sets of one dimensional sensing information to a base one dimensional sensing information respectively in order to calculate a position and a strength of an exerted pressure on the pressure and touch sensitive panel.

In an embodiment, the present invention provides a pressure and touch sensitive processing method used to control a pressure and touch sensitive panel. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The pressure and touch sensitive processing method including: emitting a driving signal by at least part of the multiple electrical wiring points; measuring the multiple first electrodes and the multiple second electrodes at the same time to obtains two sets of one dimensional sensing information; and comparing the two sets of one dimensional sensing information to a base one dimensional sensing information respectively in order to calculate a position and a strength of an exerted pressure on the pressure and touch sensitive panel.

In an embodiment, the present invention provides a pressure and touch sensitive system including a pressure and touch sensitive panel, and a touch sensitive processing apparatus. The pressure and touch sensitive panel includes at least one elastic and dielectric element, and a ring force sensitive electrode and a touch sensitive substrate respectively disposed at two sides of the elastic and dielectric element. The touch sensitive substrate includes multiple first electrodes being parallel to a first axis and multiple second electrodes being parallel to a second axis. The ring force sensitive electrode includes multiple electrical wiring points. The touch sensitive processing apparatus connects to the multiple first electrodes, the multiple second electrodes, and the multiple electrical wiring points included by the ring force sensitive electrode. The touch sensitive processing apparatus includes at least one driving circuit, at least one measuring circuit, and a processor configured to perform the following steps including: directing the driving circuit to emit a driving signal by at least part of the multiple electrical wiring points; directing the measuring circuit to measure the multiple first electrodes and the multiple second electrodes at the same time to obtains two sets of one dimensional sensing information; and comparing the two sets of one dimensional sensing information to a base one dimensional sensing information respectively in order to calculate a position and a strength of an exerted pressure on the pressure and touch sensitive panel.

In an embodiment, this invention provides a pressure and touch sensitive panel, including: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element.

In certain embodiments, positions of the two first force sensitive electrodes correspond to two outermost of the multiple first electrodes, positions of the two second force sensitive electrodes correspond to two outermost of the multiple second electrodes.

In certain embodiments, positions of the two first force sensitive electrodes are outer than two outermost of the multiple first electrodes, positions of the two second force sensitive electrodes are outer than two outermost of the multiple second electrodes. In certain embodiments, the two outermost of the multiple first electrodes and the two outermost of the multiple second electrodes respectively extend to four corresponding edges of the touch sensitive substrate. In certain embodiments, the pressure and touch sensitive panel further includes multiple spacers respectively disposed between the two first force sensitive electrodes and two outermost of the multiple second electrodes, and between the two second force sensitive electrodes and two outermost of the multiple first electrodes.

In certain embodiments, a shape of the elastic and dielectric element is the same as that of the ring force sensitive electrode. The elastic and dielectric element includes multiple sections of elastic and dielectric substances.

In an embodiment, this invention provides a touch sensitive processing apparatus configured to control a pressure and touch sensitive panel. The pressure and touch sensitive panel includes: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element. The pressure and touch sensitive processing apparatus connects to the multiple first electrodes, the multiple second electrodes, the two first force sensitive electrodes, and the two second force sensitive electrodes. The touch sensitive processing apparatus includes at least one driving circuit, at least one measuring circuit, and a processor configured to perform the following steps including: directing the driving circuit to drive the two first force sensitive electrodes in turn or at the same time; directing the measuring circuit to measure two first measuring values from two outermost of the first electrodes; directing the driving circuit to drive the two second force sensitive electrodes in turn or at the same time; directing the measuring circuit to measure two second measuring values from two outermost of the second electrodes; and comparing the two first measuring values and the two second measuring values to a base measuring value respectively in order to calculate a position and a strength of an exerted pressure on the pressure and touch sensitive panel.

In an embodiment, this invention provides a pressure and touch sensitive processing method used to control a pressure and touch sensitive panel. The pressure and touch sensitive panel inclues: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element. The pressure and touch sensitive processing method including: driving the two first force sensitive electrodes in turn or at the same time; measuring two first measuring values from two outermost of the first electrodes; driving the two second force sensitive electrodes in turn or at the same time; measuring two second measuring values from two outermost of the second electrodes; and comparing the two first measuring values and the two second measuring values to a base measuring value respectively in order to calculate a position and a strength of an exerted pressure on the pressure and touch sensitive panel.

In an embodiment, this invention provides a pressure and touch sensitive system including a pressure and touch sensitive panel and a touch sensitive processing apparatus. The pressure and touch sensitive panel includes: a touch sensitive substrate including multiple first electrodes being parallel to a first axis and multiple second electrodes being parallel to a second axis; at least one elastic and dielectric element; and two first force sensitive electrodes being parallel to the first axis and two second force sensitive electrodes being parallel to the second axis, wherein the touch sensitive substrate and the force sensitive electrodes are respectively disposed at two sides of the elastic and dielectric element. The touch sensitive processing apparatus connects to the multiple first electrodes, the multiple second electrodes, the two first force sensitive electrodes, and the two second force sensitive electrodes. The touch sensitive processing apparatus includes at least one driving circuit, at least one measuring circuit, and a processor configured to perform the following steps including: directing the driving circuit to drive the two first force sensitive electrodes in turn or at the same time; directing the measuring circuit to measure two first measuring values from two outermost of the first electrodes; directing the driving circuit to drive the two second force sensitive electrodes in turn or at the same time; directing the measuring circuit to measure two second measuring values from two outermost of the second electrodes; and comparing the two first measuring values and the two second measuring values to a base measuring value respectively in order to calculate a position and a strength of an exerted pressure on the pressure and touch sensitive panel.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A pressure and touch sensitive panel comprising:
   at least one elastic and dielectric element; and
   a ring force sensitive electrode located by one side of the elastic and dielectric element, wherein the ring force sensitive electrode comprises a plurality of electrical wiring points for connecting to a touch sensitive processing apparatus for the pressure and touch sensitive panel,
   wherein the pressure and touch sensitive panel is adjacent to a touch sensitive substrate, the touch sensitive substrate and the ring force sensitive electrode are respectively disposed at two sides of the elastic and dielectric element,
   wherein the touch sensitive substrate comprises a plurality of first electrodes being parallel to a first axis and a plurality of second electrodes being parallel to a second axis, the plurality of first electrodes and the plurality of second electrodes are connected to the touch sensitive processing apparatus,
   wherein a shape of the ring force sensitive electrode is bigger than a projection of a rectangle formed by two outermost of the plurality of first electrodes and two outermost of the plurality of second electrodes of the touch sensitive substrate,
   wherein the two outermost of the plurality of first electrodes and the two outermost of the plurality of second electrodes respectively extend to four corresponding edges of the touch sensitive substrate.

2. The pressure and touch sensitive panel of claim 1, further comprising a plurality of spacers disposed between the elastic and dielectric element and the touch sensitive substrate.

3. The pressure and touch sensitive panel of claim 2, wherein an elastic coefficient for each of the plurality of spacers is different from that of the elastic and dielectric element.

4. The pressure and touch sensitive panel of claim 1, wherein a shape of the elastic and dielectric element is the same as that of edges of the touch sensitive substrate.

5. The pressure and touch sensitive panel of claim 1, further comprising a plurality of spacers disposed between the ring force sensitive electrode and the plurality of first electrodes and two outermost of the plurality of second electrodes of the touch sensitive substrate.

6. The pressure and touch sensitive panel of claim 1, wherein the elastic and dielectric element comprises a plurality of sections of elastic and dielectric substances.

7. The pressure and touch sensitive panel of claim 1, wherein the plurality of electrical wiring points are respectively at corners of the ring force sensitive electrode.

8. A touch sensitive processing apparatus configured to control a pressure and touch sensitive panel, the pressure and touch sensitive panel comprising at least one elastic and dielectric element, and a ring force sensitive electrode and a touch sensitive substrate respectively disposed at two sides of the elastic and dielectric element, the touch sensitive substrate comprising a plurality of first electrodes being parallel to a first axis and a plurality of second electrodes being parallel to a second axis, the ring force sensitive electrode comprising a plurality of electrical wiring points, the touch sensitive processing apparatus connected to the plurality of first electrodes, the plurality of second electrodes, and the plurality of electrical wiring points included by the ring force sensitive electrode, wherein a shape of the ring force sensitive electrode is bigger than a projection of a rectangle formed by two outermost of the plurality of first electrodes and two outermost of the plurality of second electrodes of the touch sensitive substrate, wherein the two outermost of the plurality of first electrodes and the two outermost of the plurality of second electrodes respectively extend to four corresponding edges of the touch sensitive substrate, the touch sensitive processing apparatus comprising:
at least one driving circuit;
at least one measuring circuit; and
a processor configured to perform the following steps comprising:
directing the driving circuit to emit a driving signal by at least part of the plurality of electrical wiring points;
directing the measuring circuit to simultaneously measure the plurality of first electrodes and the plurality of second electrodes to obtains two sets of one dimensional sensing information; and
comparing the two sets of one dimensional sensing information to a base one dimensional sensing information respectively in order to calculate a position and a strength of an exerted pressure on the pressure and touch sensitive panel.

9. A pressure and touch sensitive processing method used to control a pressure and touch sensitive panel, the pressure and touch sensitive panel comprising at least one elastic and dielectric element, and a ring force sensitive electrode and a touch sensitive substrate respectively disposed at two sides of the elastic and dielectric element, the touch sensitive substrate comprising a plurality of first electrodes being parallel to a first axis and a plurality of second electrodes being parallel to a second axis, wherein a shape of the ring force sensitive electrode is bigger than a projection of a rectangle formed by two outermost of the plurality of first electrodes and two outermost of the plurality of second electrodes of the touch sensitive substrate, wherein the two outermost of the plurality of first electrodes and the two outermost of the plurality of second electrodes respectively extend to four corresponding edges of the touch sensitive substrate, the ring force sensitive electrode comprising a plurality of electrical wiring points, the pressure and touch sensitive processing method comprising:
emitting a driving signal by at least part of the plurality of electrical wiring points;
measuring the plurality of first electrodes and the plurality of second electrodes at the same time to obtains two sets of one dimensional sensing information; and
comparing the two sets of one dimensional sensing information to a base one dimensional sensing information respectively in order to calculate a position and a strength of an exerted pressure on the pressure and touch sensitive panel.

10. A pressure and touch sensitive system comprising:
a pressure and touch sensitive panel, comprising:
at least one elastic and dielectric element; and
a ring force sensitive electrode and a touch sensitive substrate respectively disposed at two sides of the elastic and dielectric element, the touch sensitive substrate comprising a plurality of first electrodes being parallel to a first axis and a plurality of second electrodes being parallel to a second axis, the ring force sensitive electrode comprising a plurality of electrical wiring points, wherein a shape of the ring force sensitive electrode is bigger than a projection of a rectangle formed by two outermost of the plurality of first electrodes and two outermost of the plurality of second electrodes of the touch sensitive substrate, wherein the two outermost of the plurality of first electrodes and the two outermost of the plurality of second electrodes respectively extend to four corresponding edges of the touch sensitive substrate, and
a touch sensitive processing apparatus connected to the plurality of first electrodes, the plurality of second electrodes, and the plurality of electrical wiring points included by the ring force sensitive electrode, the touch sensitive processing apparatus comprising:
at least one driving circuit;
at least one measuring circuit; and
a processor configured to perform the following steps comprising:
directing the driving circuit to emit a driving signal by at least part of the plurality of electrical wiring points;
directing the measuring circuit to simultaneously measure the plurality of first electrodes and the plurality of second electrodes to obtains two sets of one dimensional sensing information; and
comparing the two sets of one dimensional sensing information to a base one dimensional sensing information respectively in order to calculate a position and a strength of an exerted pressure on the pressure and touch sensitive panel.

* * * * *